(12) United States Patent
Palmer et al.

(10) Patent No.: US 10,697,294 B2
(45) Date of Patent: Jun. 30, 2020

(54) VIBRATION WHILE DRILLING DATA PROCESSING METHODS

(71) Applicant: Datacloud International, Inc., Seattle, WA (US)

(72) Inventors: Daniel Palmer, Santa Barbara, CA (US); James Rector, Oakland, CA (US)

(73) Assignee: DATACLOUD INTERNATIONAL, INC, Seattle, WA (US)

( * ) Notice: Subject to any disclaimer, the term of this patent is extended or adjusted under 35 U.S.C. 154(b) by 0 days.

(21) Appl. No.: 16/359,922

(22) Filed: Mar. 20, 2019

(65) Prior Publication Data

US 2019/0257197 A1 Aug. 22, 2019

Related U.S. Application Data

(63) Continuation-in-part of application No. 16/047,528, filed on Jul. 27, 2018.

(60) Provisional application No. 62/631,655, filed on Feb. 17, 2018.

(51) Int. Cl.
*E21B 49/00* (2006.01)
*G01V 1/50* (2006.01)
*E21B 47/12* (2012.01)
*G01V 1/28* (2006.01)

(52) U.S. Cl.
CPC .......... *E21B 49/005* (2013.01); *E21B 47/122* (2013.01); *G01V 1/282* (2013.01); *G01V 1/50* (2013.01); *G01V 2200/16* (2013.01); *G01V 2210/1216* (2013.01)

(58) Field of Classification Search
CPC ............................ E21B 49/005; E21B 47/122
See application file for complete search history.

(56) References Cited

U.S. PATENT DOCUMENTS

| | | | |
|---|---|---|---|
| 4,926,391 A | 5/1990 | Rector et al. | |
| 5,050,130 A * | 9/1991 | Rector | G01V 1/375 367/27 |
| 5,631,562 A * | 5/1997 | Cram | G01V 3/30 324/333 |
| 7,911,760 B2 | 3/2011 | Lownds | |
| 8,416,418 B2 | 4/2013 | Kendall | |

(Continued)

FOREIGN PATENT DOCUMENTS

EP 0366477 B1 11/1991

OTHER PUBLICATIONS

Partha Das Sharma, Measurement While Drilling (MWD) and Image Analysis Systems, http://miningandblasting.worldpress.com.

(Continued)

*Primary Examiner* — Manuel A Rivera Vargas
*Assistant Examiner* — Yaritza H Perez Bermudez
(74) *Attorney, Agent, or Firm* — Richard A. Fagin

(57) ABSTRACT

A method for determining properties of rock formations using drill string vibration measurements includes entering into a processor signals corresponding to vibrations detected along a rotating part of a drill string while drilling a borehole. The vibration signals are transformed into transformed signals representing elastic response of the drill string, the rock formations and borehole fluid to a filtered impulse originating at a known location along the drill string. Properties of the rock formations are calculated using the transformed signals.

30 Claims, 8 Drawing Sheets

(56) References Cited

U.S. PATENT DOCUMENTS

| | | |
|---|---|---|
| 8,538,698 B2 | 9/2013 | Heck |
| 8,649,980 B2 | 2/2014 | Gulati |
| 9,562,988 B2 * | 2/2017 | Wilson |
| 9,618,310 B2 | 4/2017 | Brent et al. |
| 2004/0257240 A1 | 12/2004 | Chen et al. |
| 2005/0171700 A1 | 8/2005 | Dean |
| 2006/0262480 A1 | 11/2006 | Stewart |
| 2007/0081091 A1 | 4/2007 | Pan |
| 2010/0033552 A1 | 2/2010 | Ogawa |
| 2010/0128982 A1 * | 5/2010 | Dvorkin ............... G06T 7/0004 382/171 |
| 2012/0139325 A1 | 6/2012 | Norberg et al. |
| 2012/0169841 A1 | 7/2012 | Chemali |
| 2012/0211649 A1 | 8/2012 | Hallundbaeck |
| 2012/0323495 A1 | 12/2012 | Zhou |
| 2013/0192850 A1 | 8/2013 | Craik |
| 2013/0318019 A1 | 11/2013 | Jamison et al. |
| 2014/0083765 A1 | 3/2014 | Hoult et al. |
| 2014/0119159 A1 | 5/2014 | Calvez et al. |
| 2014/0136170 A1 | 5/2014 | Leahy et al. |
| 2014/0343754 A1 | 11/2014 | Poettker et al. |
| 2015/0006444 A1 | 1/2015 | Tamatsu et al. |
| 2015/0052092 A1 | 2/2015 | Tang et al. |
| 2015/0071033 A1 | 3/2015 | Thompson et al. |
| 2015/0381981 A1 | 12/2015 | Gelman |
| 2016/0042272 A1 | 2/2016 | Mohaghegh |
| 2016/0069655 A1 | 3/2016 | Brent |
| 2016/0109592 A1 * | 4/2016 | Sun ..................... G01V 1/303 367/46 |
| 2016/0119159 A1 | 4/2016 | Zhao |
| 2016/0209195 A1 | 7/2016 | Kruger et al. |
| 2016/0299091 A1 | 10/2016 | Bamber et al. |
| 2016/0313107 A1 | 10/2016 | Birkin |
| 2017/0028443 A1 | 2/2017 | Bamber et al. |
| 2017/0038188 A1 | 2/2017 | Handel |
| 2017/0124711 A1 | 5/2017 | Chandraker et al. |
| 2017/0146452 A1 | 5/2017 | Ben-Dor et al. |
| 2018/0100388 A1 * | 4/2018 | Wilson ................ E21B 47/123 |
| 2019/0153859 A1 | 5/2019 | Neale .................. E21B 47/16 |

OTHER PUBLICATIONS

Unknown, Mineral Detection in the Infrared Using Reflectance Spectroscopy, Geo Spectal Imaging. www.geospectral.co.uk.

S.G. Walters, Driving Productivity by Increasing Feed Quality Through Application of Innovative Grade Engineering Technologies.

Okuchaba, O., Thesis for Master of Science Degree, Development of a Model to Calculate Mechanical Specific Energy for Air Hammer Drilling Systems, Texas A&M University, May 2008.

International Search Report and Written Opinion, International Application No. PCT/US2019/018210 dated May 17, 2019.

\* cited by examiner

VIBRATION WHILE DRILLING DATA PROCESSING METHODS

CROSS REFERENCE TO RELATED APPLICATIONS

Continuation in part of U.S. patent application Ser. No. 16/047,528 filed on Jul. 27, 2018. Priority is claimed from U.S. Provisional Application No. 62/631,655 filed on Feb. 17, 2018, which application is incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates generally to the field of measurements while wellbore drilling using a drill bit as an elastic wave energy source. More specifically, the disclosure relates to apparatus and methods for acquiring drilling vibration data created by drill bit interactions with the formation being drilled using sensors attached to the drill string, and in some cases the ground, and processing the acquired data to obtain properties, relative properties, or property indications of the rock formations being drilled using vibrations generated by interaction of a drill bit with rock formations.

Obtaining drilling vibration signals generated by interaction of a drill bit with rock formations during drilling of such formations is known in the art for the purpose of obtaining certain seismic properties of rock formations in the vicinity of the borehole. A method and apparatus for obtaining such signals and processing the signals to obtain seismic properties are described. In U.S. Pat. No. 4,926,391 issued to Rector et al. A generalized description of an apparatus disclosed in such patent is as follows. The apparatus includes a drilling rig and a rotary drill bit attached to the drilling rig for providing seismic waves traveling through the earth as the bit drills a formation. There is at least one seismic wave sensor spaced from the rotary drill bit in the earth for receiving signals traveling via direct seismic wave paths and signals traveling via seismic wave paths reflected by the subterranean geologic formation from the seismic waves provided by the drill bit. At least one reference sensor is located on or proximate to the drilling rig. A means is connected to receive the reference signal from the reference sensor and the drill bit generated signals from the at least one seismic wave sensor to distinguish the drill bit generated signals from interference signals by cross-correlating the reference and seismic wave sensor signals. The apparatus has a means connected to receive the reference signals either prior to or subsequent to their cross correlation for reference deconvolution or whitening. A means is connected to receive the cross-correlated reference and seismic wave sensor signals for eliminating rig generated energy from the reference signals. A means is connected to receive the cross correlated reference and seismic wave sensor signals from the rig generated energy eliminating means for separating the seismic wave sensor signals into a first group of the seismic wave sensor signals representing the drill bit generated seismic waves received by the at least one seismic wave sensor in the direct seismic wave paths, and a second group of the seismic wave sensor signals representing the drill bit generated seismic waves received by the at least one seismic wave sensor in the seismic wave paths reflected by the subterranean geologic formation. This method makes measurements corresponding to rock properties of formations located between the drill bit and the seismic sensors according to the ray paths of seismic signals in the earth.

Some properties of rock formations are not provided by seismic while drilling apparatus methods and apparatus known in the art. For example, some local mechanical properties of the of the rock formations at the interface between the drill bit and the rock formations, such as uniaxial compressive strength (UCS) density, Elastic Modulus are not provided. It is desirable to obtain such properties during drilling for wells used, as a non-limiting example, for blast holes drilled as part of construction of mining procedures. Having information about rock formation properties such as Elastic Modulus may assist in choosing appropriate blasting parameter (e.g., weight of, placement of and type of explosive) and in understanding the local geology of the formation being drilled for mine process optimization.

SUMMARY

In one aspect, the present disclosure relates to a method for determining properties of rock being drilled using drill string vibration measurements. A method according such aspect comprises entering into a processor signals corresponding to vibrations detected along a rotating part of a drill string while drilling a borehole. The detected vibration signals are transformed in the processor into transformed signals representing the elastic response of the drill string combined with rock formations being impacted by the drill bit to a filtered impulse originating at a known location along the drill string. Properties of the rock formations are calculated in the processor using the transformed signals and without vibration measurements made apart from the drill string or a drilling apparatus.

In some embodiments the amplitudes of signals measured on the drill string are compared with the amplitudes of signals detected by a geophone, accelerometer or similar sensors that are in contact with the ground or rock mass to measure the radiation of energy from the drill bit. For this method it is not important if the geophone or other sensor measurement is synchronized with the drill string sensor as is required in traditional seismic while drilling. For operational efficiency such devices would be connected to the drill on points in contact with the ground such as hydraulic feet or outriggers that are pressed in contact with the ground surface. The signal from these devices may be connected to the processor using cables or a wireless connection.

Some embodiments further comprise using the calculated properties to choose at least one of a type of explosive and an amount of explosive to dispose in the borehole after drilling.

In some embodiments, the transforming and calculating is performed using an artificial neural network or convolutional neural network is trained to derive a relationship between the digital signals and rock properties obtained from other measurement methods of rock properties such as but not limited to measurement while drilling data (MWD), core measurements, or wireline log data.

In some embodiments the properties comprise elastic modulus, or velocity, or density of the formation being drilled.

In some embodiments the detecting vibrations comprises measuring acceleration or velocity.

In some embodiments the detecting vibrations comprises measuring strain.

In some embodiments the detected vibrations comprise axial vibrations.

In some embodiments the detected vibrations are measured on the drill string.

In some embodiments the vibrations are detected on the drill steel, sub, or shock sub.

Some embodiments further comprise measuring acceleration along a direction orthogonal to the axial vibrations and using the detected vibrations to enhance the quality of the property determination or to provide other properties including, but not limited to drilling parameters such as torque, weight on bit (WOB), drill string rotation speed, (RPM) or rate of penetration (ROP).

Some embodiments further comprise transmitting the calculated properties to a database comprising at least one of geological, geo-technical and mine engineering data.

Some embodiments further comprise interpolating the properties and data from the database, and generating a three dimensional model of the rock formations.

Some embodiments further comprise de-spiking the detected vibrations.

Some embodiments further comprise auto correlation of the detected vibrations.

Some embodiments further comprise cross correlating filtered vibration signals with unfiltered or differently filtered vibration signals. In general throughout this disclosure the term "correlation" includes all forms of signal correlation, including cross-correlation, autocorrelation and covariance. In some cases the same signal will be processed with different filters, and then the results correlated with each other.

Some embodiments further comprise applying a deconvolution filter derived from the detected vibrations to the detected vibrations.

Some embodiments further comprise spectrally whitening the detected vibrations.

Some embodiments further comprise frequency filtering the detected vibrations.

Some embodiments further comprise time-variant scaling the detected vibrations.

Some embodiments further comprise using amplitude estimates of the detected vibrations or transformed signals from a plurality of components or spaced apart sensors to measure drilling characteristics and bottom hole characteristics such as bit bounce, stick slip, chatter, or other characteristics.

In some embodiments detected vibrations from a plurality of spaced apart sensors on the drill string are combined to enhance selected components in the detected vibrations.

In some embodiments the transforming comprises: estimating a transfer function or a filtered impulse response of the drill string; calculating expected vibration signals corresponding to each of a plurality of predetermined values of at least one rock formation property using the estimated transfer function or a filtered impulse response; and selecting as a calculated value of the at least one rock formation property for one of the predetermined values resulting in a best match between the expected vibration signals and the detected vibration signals.

Some embodiments further comprise determining a seismic velocity of the rock formations by analyzing a Fourier spectrum of the signals.

Some embodiments further comprise calculating a ratio of amplitude of a first reflected vibration event arrival (where the reflected vibration event arrival occurs at the bit rock interface) from the drill string with respect to amplitude of a propagated vibration event originating at or near the bit and using the ratio to estimate rock formation elastic modulus.

Some embodiments further comprise using a the square root of the amplitude ratio of a second reflected event arrival or the cube root of the amplitude ratio of a third reflected event arrival, and combining the square root and cube root to attenuate noise.

Some embodiments further comprise determining a frequency spectrum of the vibration signals and calculating hardness of the rock formations using an average amplitude of the spectrum.

Some embodiments further comprise a measurement of ground vibrations or acoustic signals from a ground sensor such as a geophone or accelerometer. Such device may be connected to the drilling unit rig hydraulic feet or other part of the drilling unit.

The system may be improved by a measurement of depth of the borehole at any point in time. In some embodiments depth or 3D spatial position of the drill bit at any particular time may be provided by a measurement while drilling system installed on the drill string (MWD) that records depth, time, position and other drill related mechanical properties.

Some embodiments further comprise a drill pipe sensor measuring depth using barometric pressure to determine elevation of the top of the drill pipe and thus measure depth.

Some embodiments further comprise a radar sensor to detect the movement of the drill string and determine the position in the bore hole.

Some embodiments further comprise determining a cost function of drilling the rock formation, and using the determined cost function and the determined properties of the rock formations to optimize at least one drilling operating parameter.

In some embodiments, the cost function comprises mechanical specific energy of drilling, or a drilling cost per unit length drilled.

In some embodiments, the rock property comprises at least one of compressional velocity, shear velocity, unconfined compressive strength, shear modulus and compressional modulus.

In some embodiments, a drill bit used to drill the borehole comprises a rotary drill bit.

In some embodiments, a drill bit used to drill the borehole comprises a hammer drill bit.

Some embodiments further comprise automatically selecting the optimized drilling operating parameter using an auto-driller.

Some embodiments further comprise determining a correspondence between the cost function and the properties of the rock formation, and using the correspondence to determine when a drill bit is worn.

DETAILED DESCRIPTION

The present disclosure includes example embodiments of a vibration while drilling signal acquisition and processing system. The present disclosure includes, following the foregoing system description, a description of various embodiments of methods for processing vibration while drilling measurements to obtain properties of rock formations or indications while drilling a wellbore in such formations.

FIGS. 1 through 10 show example embodiments of a vibration while drilling signal acquisition and processing system. Following such description, example methods according to the present disclosure are described.

Figure 1:
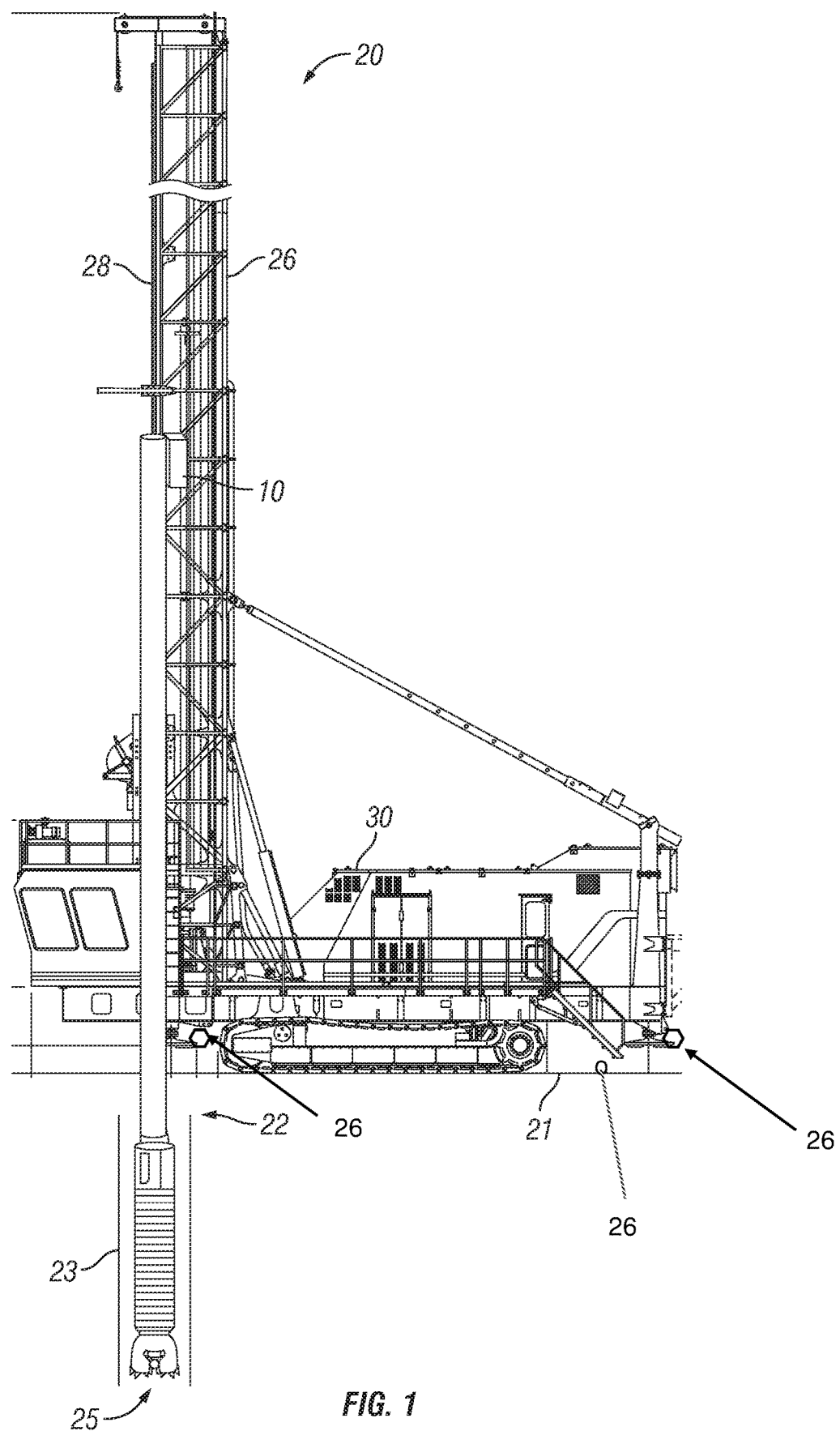
FIG. 1 shows an example embodiment of a drilling unit having a sensor assembly and data processing unit according to the present disclosure.

FIG. 1 shows an example embodiment of a vibration while drilling system used in connection with a wellbore (referred to as "borehole" in mining operations) drilling unit. The wellbore drilling unit 20 in FIG. 1 performs rotary drilling, and may be for example, a blast hole drilling unit, a shaft drilling unit of a test hole boring unit used connection with mining or construction operations or a fluid extraction well drilling unit, e.g., a well drilling unit. The wellbore drilling unit 20 may comprise a vehicle mounted mast 26 disposed on a road vehicle or an off road, tracked vehicle 30. The mast 26 may be lowered into a horizontal position on the vehicle 30 for transporting the drilling unit 20 to selected drilling positions. A drilling tool assembly (or "drill string") 22 may be suspended from a hoisted drive unit 28 engaged with the mast 26. The drive unit 28 may provide rotational and/or hydraulic or pneumatic energy to operate the drill string 22 to rotate a drill bit (see 22C in FIG. 2) at one end of the drill string 22. In FIG. 1, the drill string 22 is shown drilling a borehole or wellbore 23 through rock formations 22 disposed beneath the ground surface 21. In the example embodiment shown in FIG. 1, the drive unit 28 rotates the drill string 22, and weight of the drill string 22 is partially transferred to the drill bit (see FIG. 2) to urge the drill bit into contact with the rock formations 25 to cut through the rock formations 25, thus extend the borehole 23. Drill cuttings may be removed from the borehole by pumping compressed air or drilling liquid through the drill string 22 an out through nozzles or courses in the drill bit, subsequently moving through an annular space between the wall of the borehole 23 and the exterior of the drill string to move the drill cuttings out of the borehole 23. The drill rig may drill using as a rotary drive, and/or using a "Down hole hammer" (DTH) or top hammer system.

Components of a vibration while drilling data acquisition and processing system are shown schematically in FIG. 1 as a sensor assembly 10 and a data processing unit 40. The sensor assembly 10 may be mounted at a selected position, in some embodiments proximate the top of the drill string 22, and may include internal components, to be explained in more detail below, to detect axial vibrations in the drill string 22 and to communicate signals related to the detected axial vibrations to the data processing unit 40. In the present example embodiment, the sensor assembly may convey such signals using wireless telemetry (explained in more detail below), for which the data processing unit may comprise a corresponding wireless telemetry system (shown schematically by antenna 41).

Figure 2:
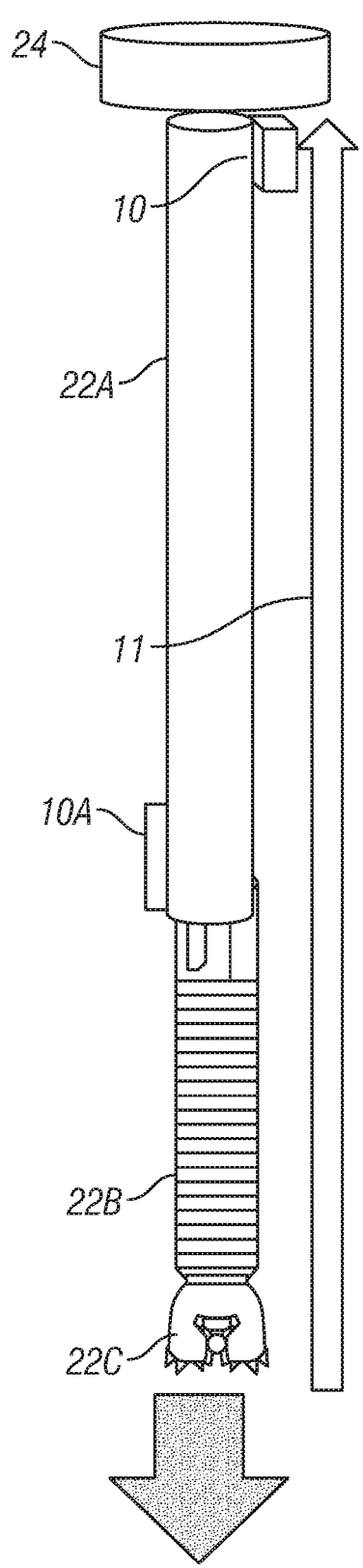
FIG. 2 shows a drilling tool assembly (drill string) and the sensor assembly shown in FIG. 1 in more detail.

FIG. 2 shows the drill string 22 in more detail. The drill string 22 may comprise drill pipe 22A, which may be comprise of threaded connected segments (joints) of drill pipe coupled at one end to a bottom hole assembly (BHA) 22B. The BHA 22B may comprise tools such as stabilizers, roller guides, heavy weight drill pipe, drill collars or other drilling tools known in the art. The drill bit 22C may be coupled to the bottom end of the BHA 22B, the top of which may be connected to the drill pipe 22A. The drill string 22 may comprise a shock absorber or isolator 24 disposed at the upper end of the drill pipe 22A between the drive unit (28 in FIG. 1) and the upper end of the drill string 22. In the present example embodiment, the sensor assembly 10 may be coupled to the drill pipe 22A proximate the shock absorber 24. Some embodiments may comprise sensors 26 such as geophones, accelerometers and any similar sensors arranged to detect vibrations apart from the drill string 22, for example, by being disposed on feet arranged to contact the ground and support the drilling unit structure, or directly on the ground as shown in FIG. 1.

The drill bit 22C may be a roller cone drill bit of types well known in the art for borehole drilling having one or more cones rotatably mounted to a bit body such that rotation of the bit body causes corresponding rotation of the one or more cones. The cones may comprise a plurality of cutting elements such as integrally formed or affixed teeth, or inserts made from hard material such as tungsten carbide or carbide coated steel. As the cutting elements are urged into contact with the rock formations (25 in FIG. 1), the cutting elements may crush the formations such that the rock fails. Some fraction of the input energy is also converted into head and vibration energy. The foregoing interaction between the drill bit 22C and the rock formations (25 in FIG. 1) induces vibrations, particularly axial vibrations at the drill bit/rock interface that propagate away from this interface up the drill string 22. In some conditions the vibrations can emanate from the drill string into the rock formations (for example when there is liquid in the borehole). The vibrations also emanate as seismic waves from the drill bit/rock formation interface into the rock formation surrounding the drill bit. The characteristics of these vibrations may be related to the input drilling characteristics, the bottom hole geometry, the rock formation properties, and the drill string properties. Fractional amounts of the vibrations propagate upwardly through the drill string 22 until they reach the sensor assembly 10, as shown by the arrow 11 in FIG. 2.

FIG. 2 also shows a second sensor assembly at 10A, which may be positioned proximate a reflecting element 10B in the drill string 22.

Figure 3:
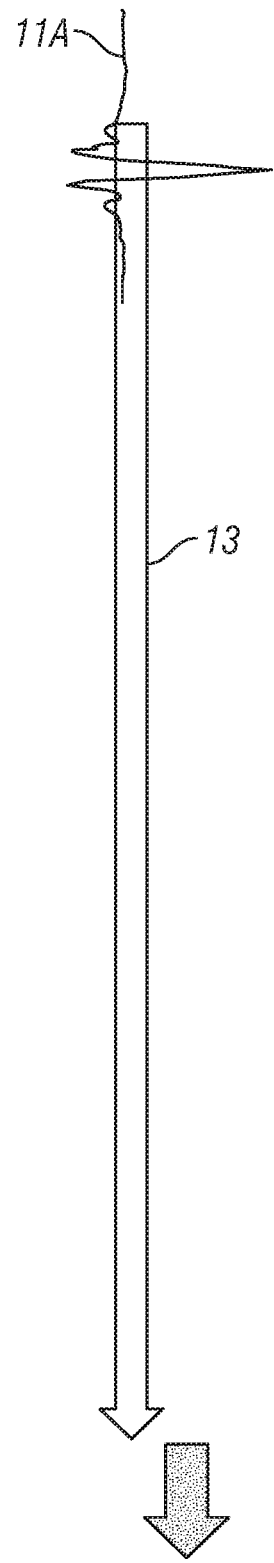
FIG. 3 shows a representation of vibration signals from the sensor assembly corresponding to drill bit/formation interactions after propagation up the drill string and after a first level of processing in the data processing unit.
Figure 4:
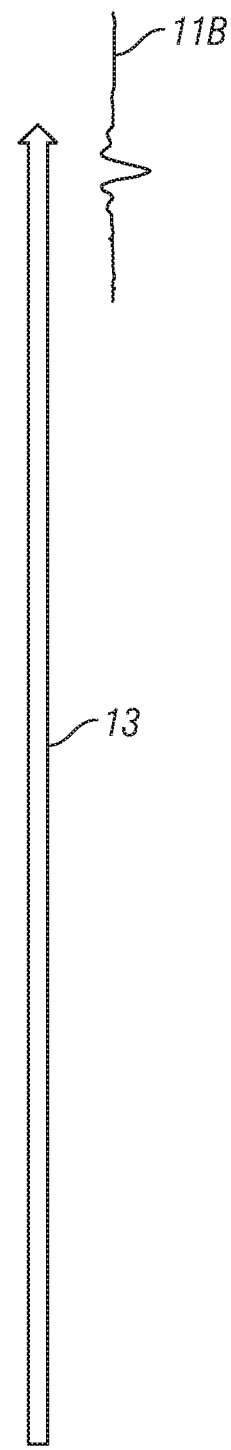
FIG. 4 shows a representation of vibration signals as in FIG. 3 but wherein the propagating vibrations from the drill bit have passed the sensor assembly and have been reflected from the shock absorber in FIG. 2 have traveled down past the sensor assembly to the bottom of the bit and have been reflected at least once again from the bottom of the drill string and have from thence propagated up the drill string and detected in the sensor assembly.

Referring to FIG. 3, on reaching the shock absorber or another device or change in mechanical properties or size that cause a change in the impedance contrast in the drill string (24 in FIG. 2), the vibrations are partially reflected and travel downwardly through the drill string as shown by arrow 13 until some fraction reach the bottom of the drill string. A fraction of the vibrations also continue to travel upwardly. A waveform 11A represents a signature of the vibrations propagating from the drill bit through the drill string and detected by the sensor assembly (10 in FIG. 2). Referring to FIG. 4, on reaching the bottom of the drill string, a fraction of the vibrations are again reflected so as to travel upwardly along the drill string, indicated by arrow 15, and are again detected by the sensor assembly at a later time. A waveform 11B represents a signature of the twice reflected (at the bit/formation interface) vibrations detected by the sensor assembly (10 in FIG. 2).

Figure 5:
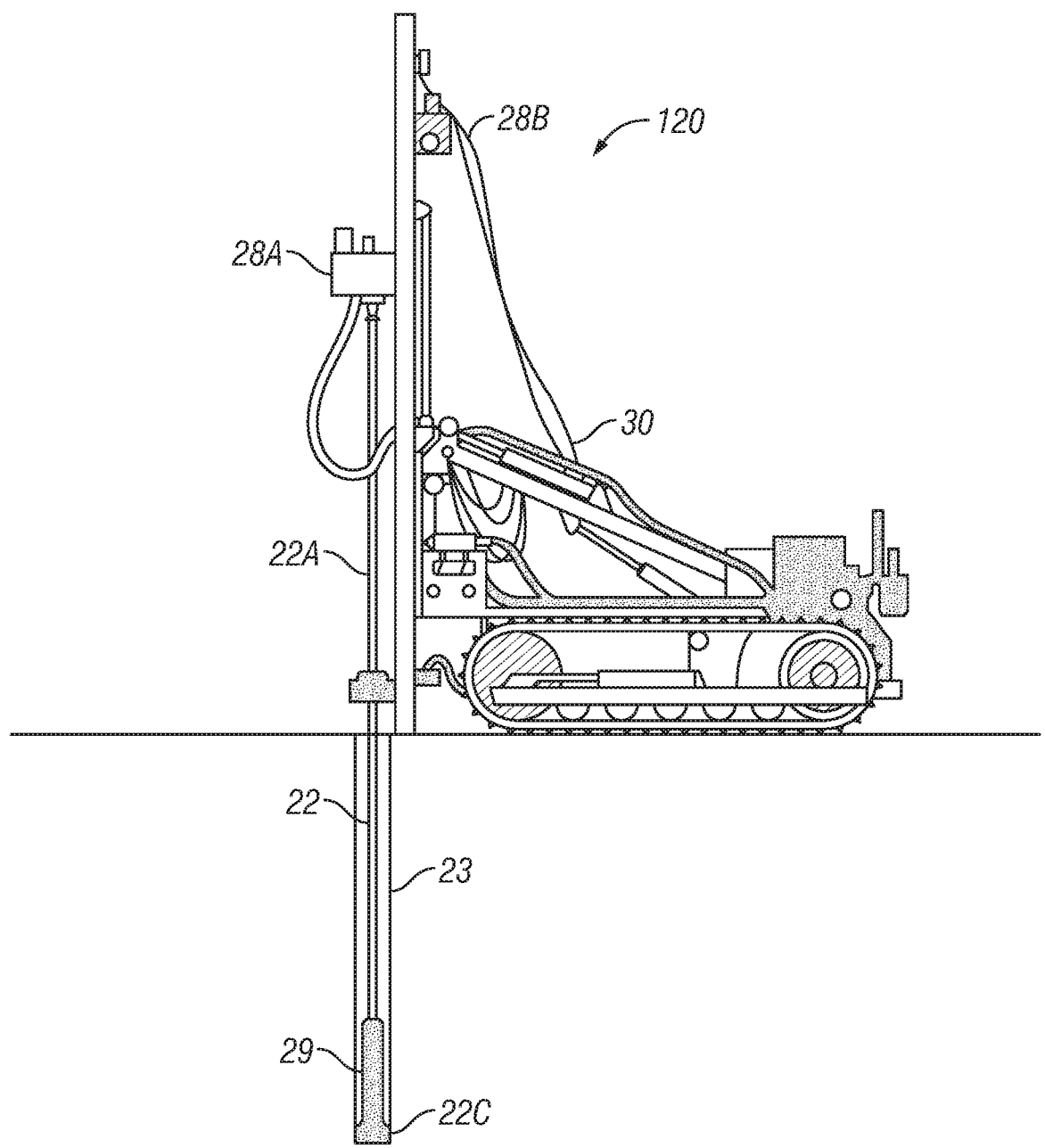
FIG. 5 shows another example embodiment of a drilling unit.

FIG. 5 shows another example embodiment of a drilling unit 120 that may be used with a system according to the present disclosure. The drilling unit 120 may be of a type that performs percussion (hammer) drilling. A mast 122 having a rotation motor or drive unit 28A and a feed motor 28B to rotate and axially displace, respectively, a drive rod or tube 22A may be mounted to a vehicle 122. In the present embodiment, rotation of the drive rod or tube 22A may cause operation of a drill hammer 29 at the lower end of the drive rod or tube 22A. Percussion generated by the drill hammer 29 is transferred to a hammer bit 22C of types known in the art for borehole drilling using drilling hammers. The action of the drill hammer 29 and the hammer bit 22C serves to elongate the borehole 23. Interaction between the hammer bit 22C and the rock formations induces vibrations in the drive rod or tube 22A. Such vibrations may be detected by a sensor assembly 10 as explained with reference to FIGS. 2, 3 and 4. Signals generated in the sensor assembly 10 may be communicated to a data processing unit 40 substantially as explained with reference to FIG. 1.

Figure 6A:
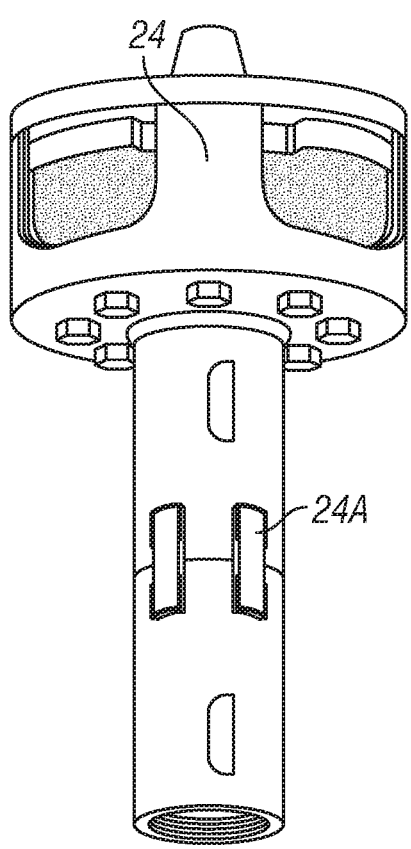
FIGS. 6A and 6B show respective example embodiments of a shock absorber disposed between a drive unit on the drilling unit and a top end of the drill string.
Figure 6B:
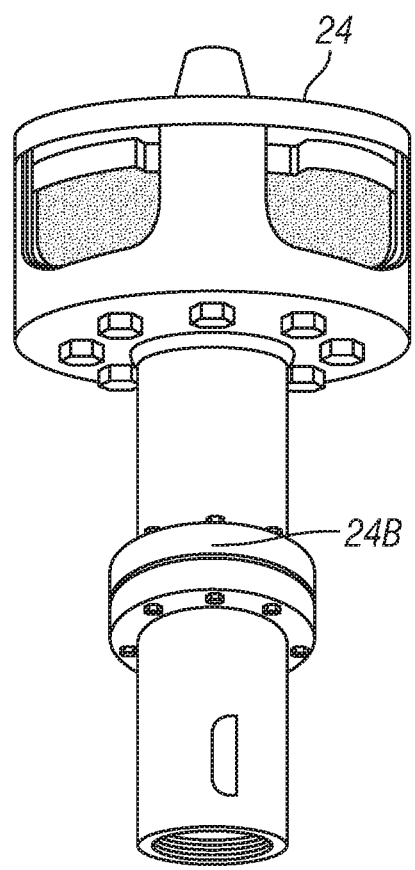

Various embodiments of the shock absorber 24 are shown in FIGS. 6A and 6B. In FIG. 6A, a rotary output end of the shock absorber may be affixed to a crossover sub or adapter to connect to the top of the drill string (22 in FIG. 1) by welded on straps 24A. In FIG. 6B, rotary connection to the crossover sub may be made using a profile torque transmitting element, for example and without limitation a square or hex drive 24B.

Figure 6C:
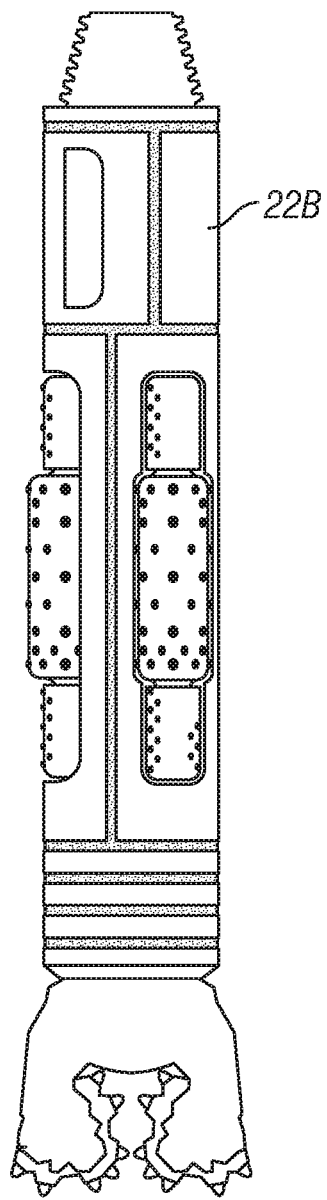
FIGS. 6C and 6D show, respectively, various embodiments of a bottom hole assembly (BHA) that may be used to connect the drill bit to a lower end of a drive rod or drill pipe.
Figure 6D:
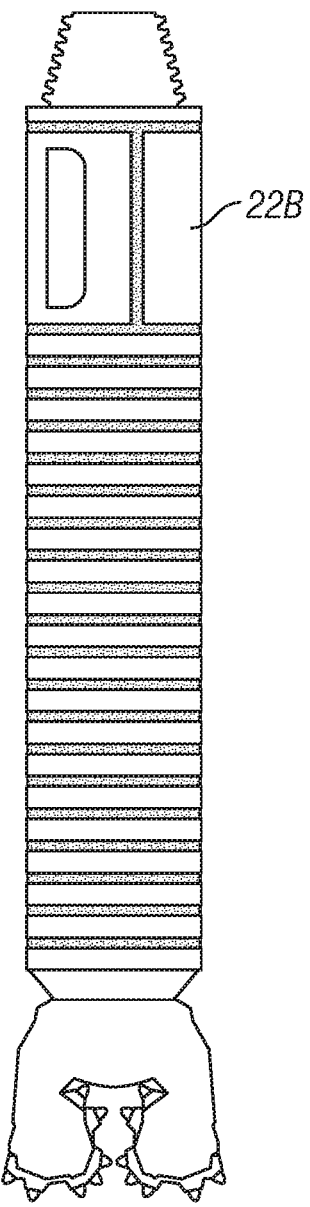

FIG. 6C shows one embodiment of the BHA 22B which may comprise a roller stabilizer. Another embodiment of the BHA 22B, shown in FIG. 6D may comprise a bit sub.

In embodiments used in connection with deeper hole drilling, typically for depth greater than 500 meters for example, the system may comprise one or more of the following features. The sensor (see 52 in FIG. 8) may be a high frequency (e.g., minimum upper limit of detectable acceleration frequency of at least 400 Hz and in some embodiments 5 kHz) accelerometer coupled to the drill string at or close to a reflecting element, for example as shown at 10B in FIG. 2. A reflecting element may comprise a change in cross section of the components of the drill string and/or acoustic impedance of adjacent components of the drill string to cause a reflection of drill induced vibrations back to the drill bit at or above a certain frequency. The foregoing may take advantage of the change in drill string component diameter in a near bit stabilizer, an hydraulic drilling motor, a rotary steerable directional drilling system, a drill bit shock sub, shock absorber or other BHA components. Reflecting some of the drill bit vibration energy back to the bit to enhance measurement of the rock formation elastic moduli while drilling. The distance from the drill bit to the reflecting element implemented as described above may be optimized to maximize signal to noise ratio. In some embodiments, a processor may be provided in the sensor assembly, connected to the drill string, configured to calculate rock formation Elastic Modulus or indications thereof or other rock formation properties or indications of during drilling, and to record and or communicate such calculated properties to the MWD system for storage and communication in real time, or to communicate the calculated rock formation properties or indications of to another location for use.

Figure 7:
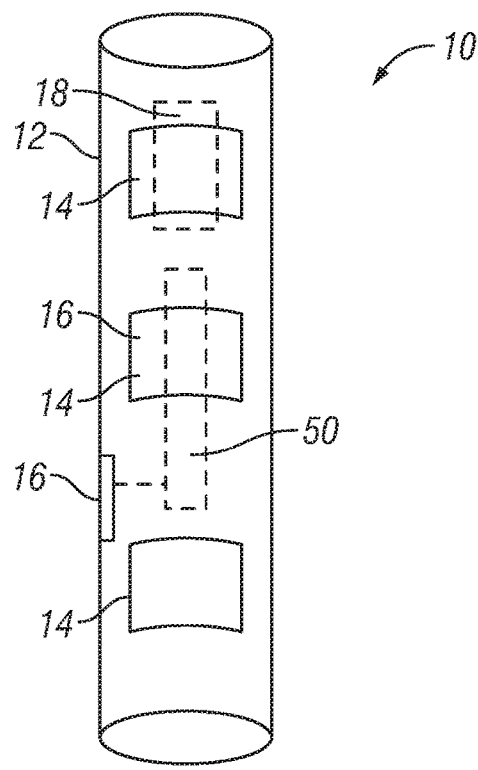
FIG. 7 shows an example embodiment of a sensor assembly.

FIG. 7 shows an example embodiment of a sensor assembly 10 according to the present disclosure. Circuitry 50 having components therein to perform vibration detection and detected vibration signal processing may be disposed in a weather tight housing 12. The housing 12 may be configured to mount on the drill string (22 in FIG. 1) in such places as shown in FIG. 1 and FIG. 2. In the present example embodiment, the housing 12 may be secured to the drill string (22 in FIG. 1) using permanent magnets 14 affixed to the housing 12. The permanent magnets 14 may be made from neodymium-iron-boron magnetic material such as may be obtained, for example, from Dexter Magnetic Technologies, Inc., Elk Grove Park, Ill. The circuitry 50 may be provided with electrical power from a self-contained power source 18 such as one or more batteries. Signals produced by the circuitry 50 to be communicated to the data processing unit (40 in FIG. 1) may be communicated by radio signal (explained in more detail with reference to FIG. 8), and for which an antenna 16 may be provided. The antenna 16 may be implemented, for example as a wire loop or coil disposed in a recess in the exterior of the housing in which the loop or coil may be embedded in an electrically non-conductive, non-magnetic material. Having a self-contained power source 18 and radio communication may provide that the sensor assembly 10 can detect vibrations in the drill string (22 in FIG. 1) and communicate such signals and/or processed derivatives of such signals to the data processing unit (40 in FIG. 1) conveniently without the need for a wired connection.

Figure 8:
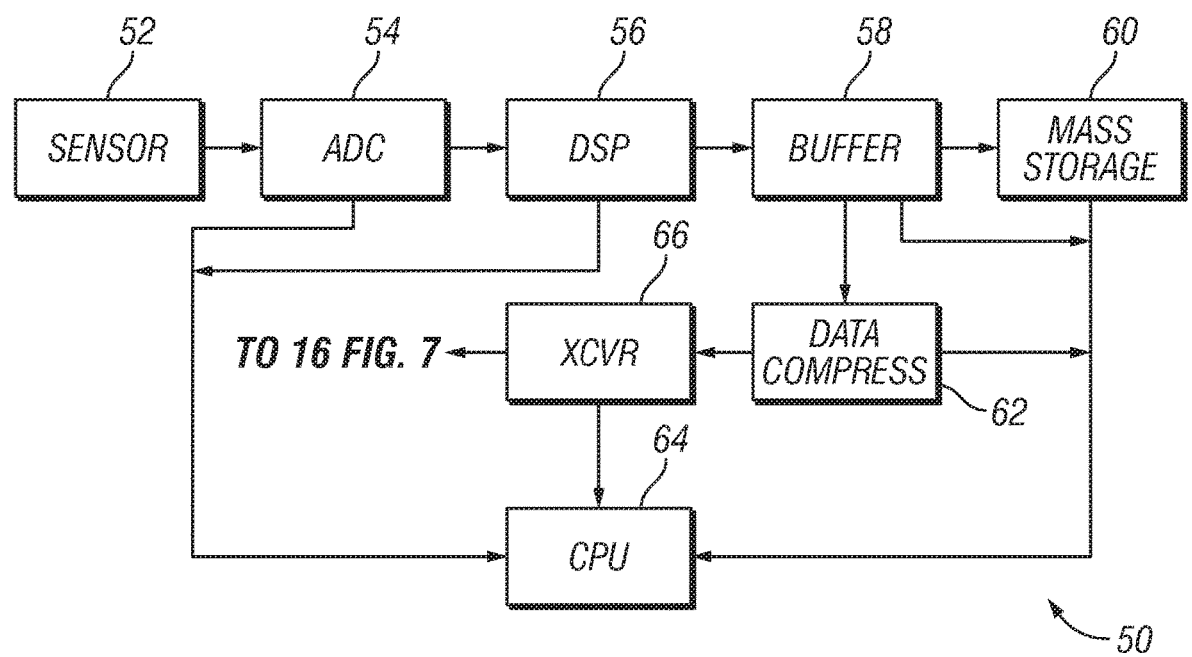
FIG. 8 shows functional components of the sensor assembly in FIG. 7.

FIG. 8 shows an example embodiment of the circuitry 50 in the sensor assembly (10 in FIG. 7). Components of the circuitry 50 may be affixed to one or more printed circuit boards, which boards may be affixed to the interior of the housing (12 in FIG. 1).

A sensor 52 may be of a type that can detect axial vibrations in the drill string (22 in FIG. 1). Non-limiting examples of such sensor 52 include piezoelectric or piezo resistive sensors such as accelerometers, strain gauges, velocity sensors and air pressure sensors that can be used to calculate the vertical displacement and movement of the drill string (22 in FIG. 1). In some embodiments, the sensor 52 may be a single component or multicomponent piezoelectric accelerometer. In some embodiments, an accelerometer may be a microelectromechanical system (MEMS) accelerometer, having one or more measurement component directions. In some embodiments the sensor 52 is mounted to the housing (12 in FIG. 7) to efficiently transmit vibrations induced in the housing (12 in FIG. 7) by the drill string (22 in FIG. 1) to the sensor 52. Characteristics of the sensor 52 that may be used in some embodiments include one or more of the following: Attaching the housing (12 in FIG. 7) using permanent magnets as shown may maintain resonance free frequency response of the sensor 52 to at least 1 kHz. The sensor 52 may have an upper limit of frequency response to at least 1 kHz. In some embodiments the upper limit may be at least 5 kHz. Maximum acceleration applicable to the sensor 52 for embodiments of the sensor assembly 10 used in rotary drilling units such as shown in FIG. 1 may be approximately 20 g. For hammer drilling as shown in FIG. 5 a maximum acceleration may be approximately 200 g. If the sensor 52 is an accelerometer, using a piezoelectric sensing element may minimize the noise floor. A non-limiting example of an accelerometer that may be used as the sensor in some embodiments is a triaxial, circuit board mounted device sold by TE Connectivity. A possible advantage of using a triaxial accelerometer if an accelerometer is used as the sensor 52 is to enable using measurements of acceleration orthogonal (normal) to the longitudinal dimension of the drill string (22 in FIG. 1) to enhance reliability or add new properties including but not limited to drilling characteristics.

Signals generated by the sensor 52 may be conducted to an analog to digital converter (ADC) 54. Digitized signals from the ADC 54 may be conducted to a digital signal processor (DSP) 56. The DSP 56 may perform processes on the digitized signals from the ADC 54, for example and without limitation, filtering and correlation. Signals processed in the DSP 56 representing selected length time windows may be stored in a buffer 58. Signals in the buffer 58 may be communicated to a mass storage device 60 such as a solid state memory. In such embodiments, the signals in the mass storage device 60 may be interrogated and processed, for example and without limitation in the data processing unit (40 in FIG. 1) during a pause in drilling operations and/or after drilling operations are completed. Signals in the buffer 58 may also be communicated to a data compression device 62. Compressed data from the data compression device 62 may be communicated to a signal transmitter, which may be part of a transceiver 66. The transceiver 66 may be, for example and without limitation a device configured to communicate with a corresponding transceiver (see FIG. 9) in the data processing unit (40 in FIG. 9). The transceiver 66 may be configured to implement wireless communication protocols such as, for example and without limitation Institute of Electrical and Electronics Engineers standards 802.11(a), (b), (g), (n) and/or (ac) or BLUETOOTH protocol. BLUETOOTH is a registered trademark of Bluetooth Special Interest Group, Inc., 5209 Lake Washington Boulevard NE Suite 350 Kirkland, Wash. 98033.

Operation of the ADC 54, DSP, 65, buffer 58, mass storage device 60, data compression device 62 and transceiver 66 may be controlled by a first central processor 64. In some embodiments, the first central processor 64 may operate the transceiver 66 intermittently based on the degree of data compression performed by the data compression device 62 so as to limit the amount of time the transceiver 66 operates. By limiting the transceiver operating time based on data compression, power from the power source (18 in FIG. 7) may be conserved.

In some embodiments, the central processor 64 may be capable of 10 Mflops to implement processes such as autocorrelation and data compression. In some embodiments, the first central processor 64 may itself implement the mass storage device 60 and/or the buffer 58, and may have in such embodiments at least 500 Mbytes storage to hold up to 20 minutes of data. The first central processor 64 may be remotely configurable, e.g., by communication using the transceiver 66. In some embodiments, the central processor 64 may calculate properties of the rock formations (25 in FIG. 1) using vibration measurements from the sensor 52.

In some embodiments, the circuitry 50 may be designed to have an average power draw of at most 25 mW. In some embodiments, the power source (18 in FIG. 7) may comprise one or more devices, for example a piezoelectric element arranged to produce electrical power from the vibrations induced in the drill string (22 in FIG. 1).

Power management performed by the central processor 64 may be configured to minimize high power operations such as data transmission (i.e., operation of the transceiver 66). Provision may be provided to activate and deactivate a "sleep" mode based on measured vibration amplitude (e.g., acceleration levels) so that power consumption is minimized while borehole drilling is not underway.

The foregoing components of the circuitry 50 may be implemented in any known form whether on a single integrated circuit or multiple, individual or combination circuit components. Fully separate components as shown in FIG. 8 are only for purposes of explaining the functions that may be performed by the circuitry 50 and are not intended to limit the scope of the present disclosure. Further, the acts of the processing described above may be implemented by running one or more functional modules in information processing apparatus such as general purpose processors or application specific chips or chip sets, such as application specific integrated circuits (ASICs), floating programmable gate arrays (FPGAs), programmable logic devices (PLDs), or other suitable devices. These modules, combinations of these modules, and/or their combination with general hardware are all included within the scope of the present disclosure.

Figure 9:
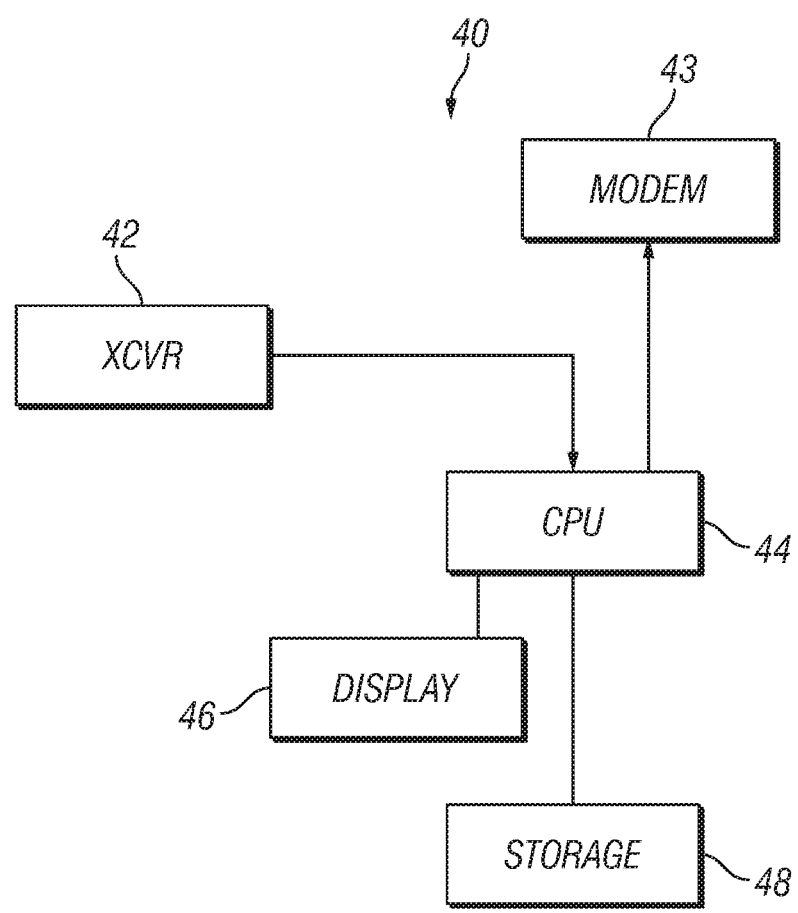
FIG. 9 shows functional components of an example embodiment of a data processing unit.

FIG. 9 shows an example embodiment of the data processing unit 40. The data processing unit 40 may comprise a receiver, implemented as a transceiver 42 capable of communication with the transmitter (implemented as the transceiver 66 in FIG. 8). The transceiver 42 may be in signal communication with a second central processor 44 forming part of the data processing unit 40. In some embodiments, the second central processor 44 may be implemented as explained with reference to the first central processor (64 in FIG. 8). The second central processor 44 may be in signal communication with a computer display 48 of any type known in the art so that a user may view processed signal output indicative of certain physical attributes of the rock formation (25 in FIG. 1) that may be determined from the vibrations detected by the sensor assembly (10 in FIG. 1). Processed and/or unprocessed signals obtained from the sensor assembly (10 in FIG. 1) may be stored on any type of mass storage device 48, which may in some embodiments be configured substantially as explained with reference to FIG. 8. The central processor 44 may manage communications between the first central processor (64 in FIG. 8) in the sensor assembly (10 in FIG. 1), and to use an LTE modem 43 to move data to an Internet-based data storage and/or processing facility. The second central processor 44 may also perform calculations such as autocorrelation and data compression and could perform data transformations and drive the display 46 to make visual representations of measurements made by the sensor assembly (10 in FIG. 1). The second central processor 44 may also function as data logger to record unprocessed measurements (e.g., in mass storage 48) as needed. The example embodiment shown in FIG. 9 may enable determining properties of the rock formations (25 in FIG. 1) using only drill string vibration-related signals detected by the sensor 52, that is, without using signals detected by any other sensor, including one or more sensors (e.g., seismic sensors) disposed proximate the ground surface (21 in FIG. 1).

In some embodiments, either or both the first central processor (64 in FIG. 8) and the second central processor (44 in FIG. 9) may have programming residing therein or able to be loaded thereon to calculate rock formation properties from the signals detected by the sensor (52 in FIG. 8).

Figure 10:
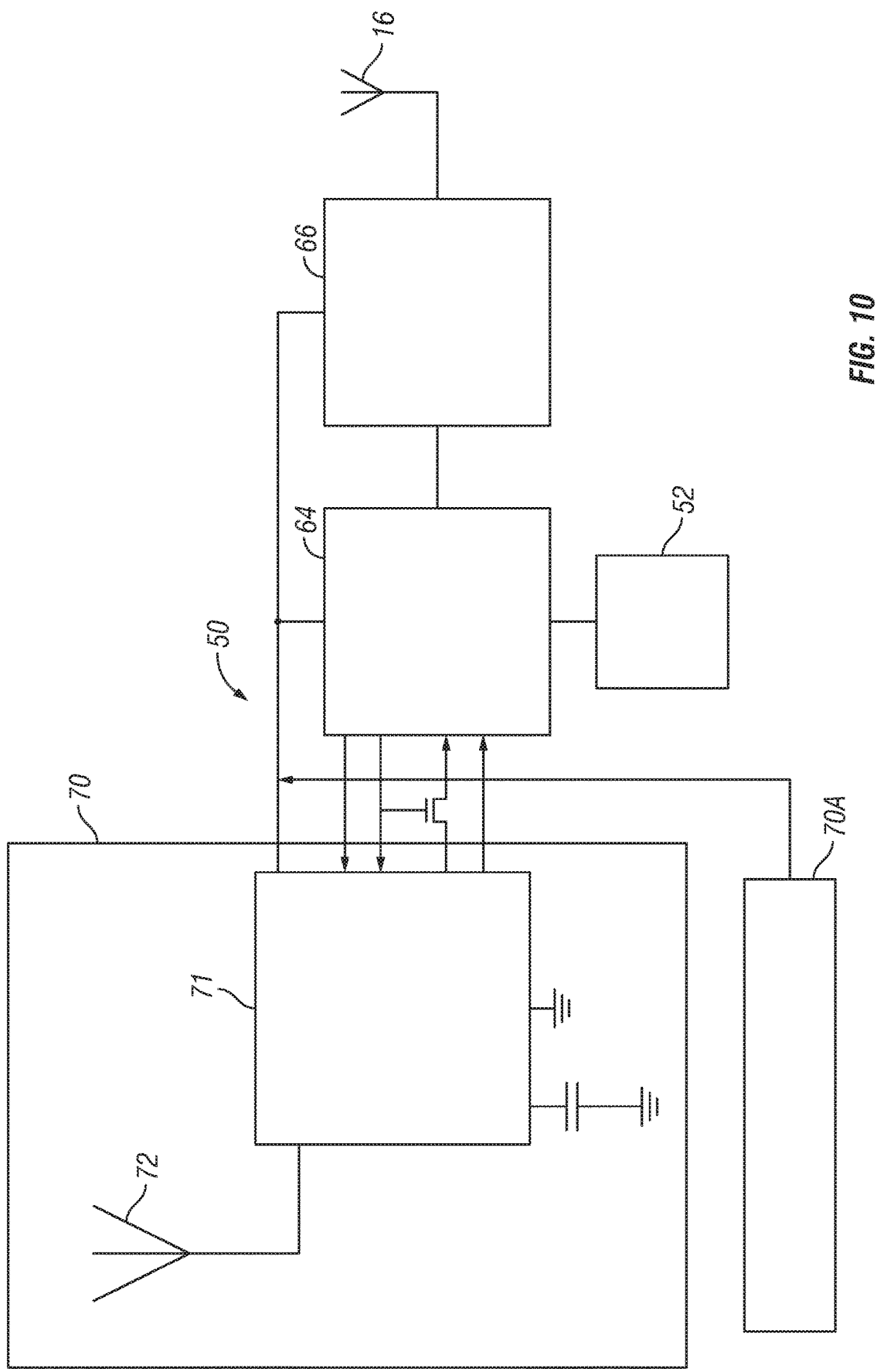
FIG. 10 shows the example embodiment of FIG. 8 including a power converting device.

In some embodiments, electrical power to operate the circuitry (50 in FIG. 8) may be supplemented or provided by an energy conversion device. The energy conversion device may be implemented as part of or in addition to the circuitry shown in FIG. 7 and FIG. 8. An example implementation of an energy conversion device is shown in FIG. 10. The energy conversion device 70 may comprise a radio frequency (RF) energy detector and converter 71, for example, one sold by Powercast, LLC, 620 Alpha Drive, Pittsburgh, Pa. 15238 as model number P2110B receiver of the POWERHARVESTER product line. POWERHARVESTER is a registered trademark of Powercast, LLC. The RF energy detector and converter 71 may have a separate antenna 72, which may be disposed in a suitable location on the exterior of the sensor assembly housing (12 in FIG. 7).

In the example embodiment shown in FIGS. 8 and 9, processed signals may be communicated from the sensor assembly circuitry (50 in FIG. 8) to the data processing unit (40 in FIG. 9), wherein the second central processor (44 in FIG. 9) in the data processing unit (40 in FIG. 9) may have instructions thereon to calculate one or more properties of the rock formations (25 in FIG. 1) from the signals generated by the sensor (52 in FIG. 1). In some embodiments, the first central processor in the sensor assembly, shown at 64 in FIG. 8 may comprise programming to enable calculating one or more properties of the rock formations. The calculated one or more properties may be stored in the mass storage device (60 in FIG. 8) and/or may be communicated to another location for storage, further communication and/or further processing, for example and without limitation, the data processing unit (40 in FIG. 9).

Other implementations of an energy conversion device may comprise vibrational energy conversion devices such as sold under designation modelA, modelD and/or modelQ by Revibe Energy, Falkenbergsgatan 3, 412 85 Gothenburg, Germany. Such energy conversion device is shown in FIG. 10 at 70A.

Having explained various embodiments of a vibration while drilling signal acquisition and processing system, example methods for processing signals acquired using such systems will be described.

Signals obtained from the sensor (52 in FIG. 8) during borehole drilling in one or more sensor assemblies (see 10 and 10A in FIG. 2) may be converted into, for example and without limitation, a predetermined, digitally sampled data format, such as the SEG-Y standard, although such formatting is not intended to limit the scope of the present disclosure. The sensors would measure acceleration, velocity, or strain of the vibrations traveling in the drill string. Signals from Multiple sensors could also be combined to measure different properties. For example, signals two vertical spaced axial velocity sensors could be processed using a weighted difference to estimate and axial strain signal between the sensors.

Detected vibrations obtained from the one or more sensor assemblies, e.g., as shown at 10 and 10A in FIG. 2, during a plurality of discrete recording time intervals may be transformed into signals that represent the elastic response of the drill string (22 in FIG. 1 combined with the rock properties at the bit/rock interface. A duration of the time intervals may be selected to provide sufficient signal to noise ratio, and the duration of the time intervals may be changed during processing in order to improve results. As the drill bit penetrates the rock over a certain distance, the response represents an average of the properties over that interval. An initial value for the duration may be, for example, about 250 milliseconds. The elastic response of the drill string to the filtered impulse may be referred to as the "impulse response" in the time domain or a "transfer function" in the frequency domain.

In some embodiments, transforming the signals in any one or more time intervals may be performed using a discrete Fourier transform and calculating an amplitude and/or a phase spectrum. In some embodiments, the transforming may be performed using a wavelet transform. In some embodiments, the transforming may be performed using a time frequency transformation. In some embodiments the transform may be the time domain equivalent of the amplitude and/or the phase spectrum such as an auto-correlation function or a cross-correlation function. In some embodiments, the transforming may be performed after filtering and editing of the detected signals in any one or more time intervals. The filtering and editing may comprise, for example, de-spiking, spectral whitening, deconvolution, frequency filtering and time-variant scaling such as automatic gain control. The transforming may be performed on any combination of detected signals in any one or more time intervals where the combination includes the signals in any one or more time intervals with or without filtering and/or editing.

In some embodiments the transformation may be made using artificial neural networks or artificial intelligence methods, by developing a set of transformation training data and using machine learning to emulate the transformation process and in some cases the rock properties estimated from the transformed data. Machine learning may be combined with filtering components as well.

The output of the transforming comprises a plurality of time series representing drill string impulse responses, where the term "impulse" may refer to the interaction of the drill bit and rock formation or a signal created and or created transformed at a position along the drill string. A frequency spectrum, comprising the specific characteristics including but not limited to amplitude and phase, of the drill string impulse responses. A wavelet transform or other transform corresponding to rock formation properties with respect to borehole depth (i.e., axial position along the borehole) as drilling progresses.

Embedded within the transformed signals is information about the mechanical properties of the rock formations. Using an analytic or numerical model of the drill string impulse response, time-dependent or frequency-dependent attributes that are directly related to rock formation mechanical properties being drilled which the signal is being sensed may also be determined. The analytic or numerical model of the drill string and in some or all cases the mechanical properties of the rock formations being drilled and the surface drill rig (density, elastic velocities, elastic moduli, Young's moduli, mass per unit length, geometry) may be used to estimate the response of the drill string at any position along the drill string to a filtered impulse at any position along the drill string.

For example, the vibrations as detected by the sensor (52 in FIG. 8)) contain transmitted vibrations, e.g., from the drill bit/rock formation interface, through the drill string to the sensor assembly (10 in FIG. 2). The detected vibrations also comprise reflected vibrations, where such reflected vibrations result from vibration reflection at the drill bit/rock formation interface, or at any other reflective elements in the drill string as explained with reference to FIG. 2. The reflected vibrations may be expected to have characteristic time-dependent attributes (amplitude, frequency, phase, etc.) because the structure, and thus the wave propagation properties of the drill string are determinable, e.g., by analytic or numerical modeling as explained above.

Characteristics the detected vibrations such as amplitude, and phase, of the frequency spectrum, all of which may be time dependent, may be obtained from the transformed signals. As a non-limiting example in the present embodiment, the spectrum of the transformed signals from any one or more recording time intervals may be computed. The spectrum of the transformed signals can be related to the seismic velocities of the rock formation being drilled.

The average amplitude of the spectrum may be used as a measure of rock formation hardness or breakability. Similarly, the spectrum of the transformed signals may be used to estimate a transfer function between the signal generation point (e.g., the interface between the drill bit (22C in FIG. 2 or any other reflective element and the sensor location). The transfer function will have resonances due to changes in the elastic properties of the drill string resulting from the structure of the drill string, and the properties of the rock formation being drilled will affect the resonance amplitudes.

By relating the resonances in the transformed signals to modeled resonances using the analytic or numerical model of the drill string and using a range of rock formation elastic modulus parameters, a best match between the resonances in the transformed signals and the modeled resonances can be obtained. Using known or otherwise determinable (e.g., modeled) values of the drill bit and the drill-string mechanical properties, a formation properties or indications transformed signals may be estimated.

For example, a ratio of amplitude of a reflected vibration arrival where the reflection is caused by the mechanical property and geometry property contrast may be calculated with respect to an upwardly propagated vibration arrival amplitude caused by the bit rock interaction while drilling. An analytic equation may be used to convert the foregoing amplitude ratio into an estimate of formation an elastic modulus, that is, a function of density and acoustic velocity of the formation. One such elastic modulus is the P-wave modulus of the material, P-wave modulus (M) also known as the longitudinal modulus or the constrained modulus, and is one of the elastic moduli available to describe isotropic homogeneous materials. It is defined as the ratio of axial stress to axial strain in a uniaxial strain state. It is calculated as the product of density and the square of the velocity of a P-wave. Thus, density can be calculated if P-wave modulus and velocity can both be measured. Other Elastic moduli are Bulk modulus (K) Young's modulus (E) Lame's first parameter ($\lambda$) Shear modulus (G, $\mu$) Poisson's ratio (v) P-wave modulus (M).

It is also possible to compute a series of theoretical impulse responses using a modeling algorithm to represent the various components of the drill string rock formation being drilled. Then by comparing (for example by cross-correlation) the filtered impulse response obtained from the vibration measurements with the modeled impulse response, and then using well known inversion processing techniques, it is possible to determine the formation properties that result in a best match between the filtered impulse response determined using the detected vibration signals and the modeled impulse response.

The impulse response of differently configured drill strings may be different due to mass, length, geometry and drill bit type. As such a "calibration" may be performed using one of the following methods. In a first method, known impulse signal is applied to the drill bit at a determinable or known time and the drill string impulse response is determined by measuring, e.g., vibration at a selected position along the drill string. In a second example method, a drilling unit, e.g., as shown in FIG. 1 or FIG. 5 is used to drill a borehole through a calibration block, i.e., a section of material having known density, compressive strength and acoustic velocity. Vibrations detected by a sensor assembly positioned, for example, as shown in FIG. 1 may be used with the known properties of the calibration block to create a transform to calibrate the response for each drilling unit and drill bit configuration.

In some embodiments, it is possible to determine formation seismic velocity of the formation being drilled using the wavelet phase of different signal arrivals.

In some embodiments, it is possible to determine seismic velocity using wavelet spreading of the filtered drill string impulse responses.

In some embodiments, the formation may not be being actively drilled but the drill string may be in contact with the formation, in this situation it is possible to estimate properties or indications of properties of the formation in contact with the bit using a controlled signal or by using components of the drilling apparatus that create vibrations apart from the drilling through a similar process with modification as is used while drilling.

In some embodiments, it is possible to determine relative velocities through changes in either of the above determined velocities.

In some embodiments, it is possible to determined velocities or relative velocities through the combination of the above determined velocities.

In some embodiments, it is possible to generate a model of the impulse response of the drill string and match the modeled impulse response to measured data to determine seismic velocity.

In some embodiments, it is possible to use seismic velocity and impedance estimates to estimate density of the formations.

Using methods according to the present disclosure it is possible to obtain properties of rock formations or indications using vibration measurements made only along a drill string or other device forming part of a drilling apparatus (drilling unit), without the need to obtain vibration, seismic or similar measurements made apart from the drilling apparatus.

In some embodiments, having more than one sensor assembly, as explained with reference to FIG. 2 may provide one or more of the following capabilities. Two longitudinally spaced apart sensor assemblies such as shown in FIG. 2 may enable easier separation of upwardly propagating vibration signals from downwardly propagating vibration signals if the sensor in each sensor assembly is directionally sensitive. Arrays of longitudinally spaced apart sensor assemblies may enable determining wave propagation characteristics of the drill string. For example, if components of the drilling unit emit noise such as rig engines or other machinery this noise may propagate downward into the drill string. This the use of multiple longitudinally spaced detectors can be used to attenuate coherent noise as well as incoherent random noise as is well known in the art.

The measurements described herein have been shown to work in drill strings used in the mining industry that are generally short, in the range of 20 to 50 meters, and typically not longer than 500 meters. For use in deep drilling, a device may be required to generate a reflection of acoustic signal traveling upwards, then back downwards to the drill bit. This can be done by ensuring the drill string contains an appropriate change in elastic modulus placed at a suitable position along length of the drill string.

Therefore in some embodiments in longer drill strings for deeper drilling, a reflector may be added to the drill string to replace the function of the shock sub shown in FIG. 2. Such a reflector may be a change in diameter or material of the drill string that reflects certain vibrations travelling axially along the drill string from the bit.

In some embodiment the apparatus may be placed inside the drill string and record filtered or computed properties and transmit this as data up the drill string.

The rock formation properties derived from vibration measurements or inferences may be associated with the depth of the borehole or axial progress of the drill bit and drill string.

The determined rock formation properties or indications may be entered into a 3D geological or geomechanics model.

The transformed signals may be used with machine learning methods, including but not limited to, an artificial neural networks, and GAMs (Generalized Additive Models) for non-linear modeling, with other rock formation properties derived from measurement while drilling data, core, or log data to train said neural network to train said machine learning systems and then derive rock properties directly from the neural network and the transformed data from the sensor.

The measurements inferred from these signals may be incorporated into a large database or 3D model of the mine subsurface. In such a model various correlations and geo-statistical calculations may be applied to make the information more valuable to the mine operator. These may include the derivation of geo-spatial and statistical relationships between different data sets, and the application of machine learning, and neural networks.

The measurements inferred from these signals may be converted from point data along the drilled hole into a three dimensional volume to represent the rock volume. This may be done using the statistical interpolation methods such as Kriging and Co-Kriging, also known as Gaussian process regression.

One skilled in the art will recognize that it is advantageous to use sensors only on the drilling apparatus as such arrangement avoids time consuming and costly deployment of sensors in the earth or on its surface. Moreover, because characteristics associated with the vibrational response of the drilling apparatus to the formation being drilled are being measured, the system has resolution comparable to high resolution conventional well logs such as image logs. High resolution allows very fine scale features to be identified and accurately registered in depth, such as fracture zones and formation bed boundaries.

In some embodiments, the rock elastic modulus is calculated from values measure on the correlated data. When the signals are correlated, a correlation peak centered at zero time lag represents the total signal amplitude.

In some embodiments, the rock elastic modulus is calculated from a ratio between (or function using) the amplitude of the correlation peak centered at zero time lag, and the amplitude of any non-zero time lag amplitude.

In some embodiments the rock elastic modulus is calculated from a ratio between (or function using) the integral over a defined window of time of the amplitude of the correlated peak centered at zero time lag, and the integral over a defined window of time of the amplitude of outside the zero time lag window.

In some embodiments the rock strength properties are calculated from the peak signal amplitude near zero lag of the correlated signals, filtered over a specific frequency range.

In some embodiments the rock strength properties are calculated from the peak acceleration of the zero lag correlation, filtered over a specific frequency range, and divided by the mass of the drill string assembly.

In some embodiments the variance of peak acceleration near the zero lag of the correlation, filtered over a specific frequency range is used to indicate the rock is jointed, fractured or faulted. When rocks are not fractured and are continuous, the system will measure a near constant value of UCS corresponding to the rock strength. When the rock is fractured it has been observed the signal amplitude drops locally in the presence of fractures.

Core recovery parameters describe the quality of core recovered from a borehole. Rock-quality designation (RQD) is a rough measure of the degree of jointing or fracturing in a rock mass, measured as a percentage of the drill core in lengths of 10 cm or more. High-quality rock has an RQD of more than 75%, low quality of less than 50%. Rock quality designation (RQD) has several definitions. The most widely used definition was developed in 1964 by D. U. Deere. It is the borehole core recovery percentage incorporating only pieces of solid core that are longer than 100 mm in length measured along the centerline of the core. The system described herein can be used to measure or estimate Rock Quality Designation. In some embodiments the number of intervals of rock showing high strength or modulus, longer than 100 mm within a section of rock, can be used to measure or estimate Rock Quality Designation (RQD). Similarly intervals between areas of elevated variance can be used to measure RQD.

In some embodiments the integral of the area within a time window near the zero lag correlation is used in combination with the rate of penetration of the drill to calculate properties related to rock hardness or specific energy of drilling.

When the measurements described herein are generated during the process of drilling a core with a diamond hole core drill. In such drills a rotating annular tool backed up by a cylindrical core sample storage device is pressed against the subject materials to cut out a cylinder of the subject material. These samples represent the volume of rock that is measured using this system. As such they are ideal to derive correlations, or training data sets for neural networks or other similar methods to calibrate and validate the data. In a similar method petrophysical logs may be used to calibrate the measurement described herein to traditional petrophysical methods.

In some embodiments determining formation seismic velocity at an end of the drill string using wavelet phase of different signal arrivals.

In some embodiments determining seismic velocity using wavelet spreading.

In some embodiments comprising determining relative velocities through changes in seismic velocities determined by at least one of wavelet spreading and wavelet phase.

In some embodiments comprising determining seismic velocities or relative seismic velocities by combining seismic velocities determined by at least one of wavelet spreading and wavelet phase.

In some embodiments a model of an impulse response of the drill string is created and matching the model of the impulse response to measured data is used to determine seismic velocity.

Those skilled in the art will readily appreciate that by importing data from a database containing time and depth based measurement while drilling data and combining time based data with depth-time conversion file to generate a depth based measurement.

Rock formation properties determined using various embodiments of a method according to the present disclosure may be used in some of the following ways. During open pit mining procedures it is valuable to make measurements that aid in the calculation of the properties of the rock to be blasted, excavated and processed.

In particular, the following measures are directly used to design, plan and execute the blasting; acoustic velocity, elastic moduli, rock strength measures, e.g., uniaxial compressive strength (UCS), joint spacing and geological boundaries. The elastic moduli and UCS can be directly related to the designed velocity of detonation (VOD) and the timing interval between detonations of blast holes. Better blasting design can improve mine economics by creating smaller and more consistent rock fragment sizes that require less cost and energy to crush into the particle size required to extract ore such as copper, gold and other valuable materials.

The compressional velocity (Vp) of rock formations is used to directly calculate the optimum delay between detonation times to achieve the most effective fragmentation of the rock. The delay time is proportional to Vp multiplied by the distance between blast holes, multiplied by an empirically determined constant. Vp can be measured directly by the methods described and used to program the delay of electronic blasting detonation systems. See, for example, Reference Paper: The Kuz-Ram fragmentation model 20 years on., C.V.B. Cunningham).

The joint spacing and orientation in rock is an input to an industry standard fragmentation model the "Kuz-Ram Fragmentation model." Several factors such as the Joint condition factor (JCF), Vertical joint plane spacing factor (JPS), Vertical joint plane angle (JPA) are used in this model. By detecting the joints in the rock while drilling such factors can be calculated.

In some mining operations, geological layers must be detected to correctly blast and remove material. For example, in coal mining, coal seam depths are ordinarily determined using wireline logs to measure density and natural gamma radiation. The measurements described herein can replace such wireline logs and can be used to detect coal seam depth to ensure the coal is not blasted with the overburden.

Rock hardness (and UCS) may also be used for design and optimization of rock crushing and milling, also known in the industry as Comminution. In this application, empirical models relate rock hardness and fragment size to the energy consumption and thru-put of the crushers and mill. Based on data from the invention disclosed accurate rock properties can be measured in real time. For example, based on a high hardness or UCS measurement the rock may be deemed un economical to process, and placed on a waste or stockpile.

Method according to the present disclosure can be used to measure rock elastic moduli, velocity and UCS. From the foregoing parameter, densities may be derived. For example, iron ore materials such as Hematite and Magnetite minerals have specific density of 5.26 and 5.18 g/cc, respectively, whereas waste minerals such as quartz have a density of 2.65 g/cc. The combination of velocity and density may be used to distinguish ore bearing rocks from waste, For example, Chalcopyrite, a common copper-bearing ore, has a density of 4.2 g/cc and a velocity (Vp) of 5.12 km/second. In contrast a common host rock such as gabbro has a density of 2.8 and a velocity of 7 km/second. (2)

Based on the measurements obtained using methods according to the present disclosure, a precise a determination of the boundary in space between waste or ore can be made while drilling. A computer system can be used to model such boundaries in three dimensional space, and mining operations such as blasting, excavating and processing can be controlled to process only rock material with economically useful properties.

It has been determined by field experiments that the described methods can be used to determine the presence of rock joints, (faults and fractures). The presence of fractures and faults is an important input to many aspects of mining and civil engineering.

The measurements may also be used to derive a synthetic Rock Quality Designation, which as a commonly used measure used in geotechnical engineering. One example is the calculation of the critical slope for planning the geometry of a mine. See, for example, Open pit mine planning and design volume 1, William Hustrulid et al.

In the mining industry it is common to measure drilling parameters such as axial force on the drill bit, amount of torque applied to rotate the drill bit, rotational speed (RPM), air pressure used to operate a pneumatic motor, and rate of axial elongation (penetration) of the well to calculate the mechanical specific energy (MSE) of drilling (using the teal equation). In the absence of other data this is used as a measure of rock properties. The equation shown below to calculate MSE is for rotary drilling.

$$MSE = \frac{WOB}{A} + \frac{120\pi\, NT}{A\, ROP} + \frac{4\, WOB}{D^2\pi} + \frac{480\, TN}{D^2 ROP}$$

in which ROP is the rate of penetration, D is the drill bit diameter, T is the torque and A is the cross sectional area of the drill bit.

For hammer (percussion bit) drilling the corresponding equation for MSE may be written:

$$MSE = \frac{120 m_{piston} V_{impact}^2 (1 - e^2) F \eta_{trans}}{4A(ROP)} + \frac{4\, WOB}{D^2\pi} + \frac{480\, TN}{D^2 ROP}$$

in which V is the hammer velocity, e is the efficiency of the hammer and F is the impact frequency. m is the mass of the piston and hammer, and η is the coefficient of transmission. It can be observed that both equations comprise a measurement of the energy input and the efficiency of the drilling process, with rock property related to MSE as an inferred output. Buy measuring both rock properties related to hardness, such as UCS or P-wave or S-wave modulus or velocity, and the MSE, the efficiency of the drilling process can be calculated with respect to rock hardness or other rock formation mechanical properties.

Drilling rigs often use an auto-driller to automatically control drilling operating parameters (e.g., axial force on bit (WOB) and RPM) to maximize the rate of penetration and drill bit performance. Rate of penetration and MSE may be used to set optimum drilling operating parameters, and an auto-driller may be operated to maintain the drilling operating parameters in response. For each value or classification of rock properties determined during drilling as explained herein, a minimum MSE or other "cost function" such as rate of penetration or cost per foot drilled can be calculated and used to determine the optimum drilling parameters. In an example embodiment, a cross plot of MSE and Vimpact (or axial force on bit) with respect to ROP may be used to determine optimum drilling parameters, e.g., axial force (weight) on the drill bit, often abbreviated as "WOB", and drill bit type.

In other embodiments the system may compare performance, e.g., with reference to ROP, of different types of drill bits in rock formations having similar mechanical properties to determine which types of drill bits are most efficient (e.g., with reference to MSE) or which types drill fastest in rock formations having certain mechanical properties. MSE in relation to certain rock formation properties can also be used to detect declining drill bit efficiency over time to determine when to change a worn drill bit.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for determining properties of rock formations being drilled using drill string vibration measurements, comprising:
   entering into a processor signals corresponding to vibrations detected along a rotating part of a drill string while drilling a borehole;
   in the processor, filtering the detected vibration signals;
   in the processor, calculating properties of the rock formations being drilled using only the filtered signals and without using measurements made apart from the drill string or a drilling apparatus for the calculating of the properties.

2. The method of claim 1, further comprising, in the processor, transforming the detected vibration signals into transformed signals representing the response of the drill string including a response of the rock formation being drilled to a filtered impulse originating at a known location along the drill string.

3. The method of claim 2 wherein the transforming comprises:
   estimating a transfer function or a filtered impulse response of the drill string;
   calculating expected vibration signals corresponding to each of a plurality of predetermined values of at least one rock formation property using the estimated transfer function or a filtered impulse response; and
   selecting as a determined value of the at least one rock formation property for one of the predetermined values resulting in a best match between the expected vibration signals and the detected vibration signals.

4. The method of claim 1 further comprising calculating a ratio of amplitude of a first reflected vibration event arrival from the drill string with respect to amplitude of a first transmitted filtered impulse vibration event and using the ratio to estimate rock formation elastic modulus.

5. The method of claim 4 further comprising using a the square root of the a ratio of a second reflected event arrival or the cube root of the amplitude ratio of a third reflected event arrival, and combining the square root and cube root to attenuate noise.

6. The method of claim 1 when said filtering comprises correlation.

7. The method of claim 1 wherein a rock elastic modulus is calculated from a ratio between amplitude of a correlation peak centered at zero time lag, and an amplitude of a non-zero time lag correlation peak.

8. The method of claim 1 wherein a rock elastic modulus is calculated from a ratio between an integral over a defined window of time of amplitude of a correlated peak centered at zero time lag, and an integral over a defined window of time of an amplitude of a correlation peak outside the zero time lag window.

9. The method of claim 1 wherein rock strength properties are calculated from a peak amplitude near zero lag of the correlated signals, filtered over a predetermined frequency range.

10. The method of claim 1 where rock strength properties are calculated from a peak amplitude of a zero lag correlation, filtered over a predetermined frequency range, and divided by the mass of the drill string.

11. The method of claim 1 wherein a variance of peak amplitude near a zero lag of a correlation, filtered over a specific frequency range is used to indicate whether the rock is jointed, fractured or faulted.

12. The method of claim 11 wherein an interval between areas of elevated variation, or intervals above a predetermined threshold are used to calculate joint spacing or Rock Quality Designation (RQD).

13. The method of claim 11 wherein a dependent property is calculated from a function combining elastic modulus and rock strength to calculate a third property related to rock acoustic velocity, and, or rock density.

14. The method of claim 1 wherein the an integral of an area within a time window near a zero lag correlation is used in combination with a rate of penetration of the drill string to calculate properties related to rock hardness or specific energy of drilling.

15. The method of claim 1 further comprising determining formation seismic velocity at an end of the drill string using the wavelet phase of different signal arrivals.

16. The method of claim 1 further comprising determining seismic velocity using wavelet spreading.

17. The method of claim 1 further comprising determining relative velocities through changes in seismic velocities determined by at least one of wavelet spreading and wavelet phase.

18. The method of claim 1 further comprising determining seismic velocities or relative seismic velocities by combining seismic velocities determined by at least one of wavelet spreading and wavelet phase.

19. The method of claim 1 further comprising generating a model of an impulse response of the drill string and matching the model of the impulse response to measured data to determine seismic velocity.

20. The method of claim 1 further comprising using seismic velocity and elastic modulus estimates to estimate a density of the rock formations.

21. The method of claim 1 wherein the drill string comprises a change in elastic modulus placed at a selected location along the length of the drill string.

22. The method of claim 1 further comprising determining a cost function of drilling the rock formation, and using the determined cost function and the determined properties of the rock formations to optimize at least one drilling operating parameter.

23. The method of claim 22 wherein the cost function comprises mechanical specific energy of drilling, or a cost per unit length of drilling.

24. The method of claim 23 wherein the rock property comprises at least one of compressional velocity, shear velocity, unconfined compressive strength, shear modulus and compressional modulus.

25. The method of claim 23 further comprising automatically selecting the optimized drilling operating parameter using an auto-driller.

26. The method of claim 23 further comprising determining a correspondence between the cost function and the properties of the rock formation, and using the correspondence to determine when a drill bit is worn.

27. A method for determining properties of rock formations being drilled using drill string vibration measurements, comprising:
    entering into a processor signals corresponding to vibrations detected along a rotating part of a drill string while drilling a borehole;
    entering into a processor signals corresponding to vibrations detected on a sensor on the ground;
    in the processor, filtering the detected vibration signals;
    in the processor, determining properties of the rock formations using only the filtered signals and without synchronizing in time vibration measurements made apart from the drill string.

28. The method of claim 27 when said filter comprises correlation.

29. The method of claim 27 where rock elastic modulus is calculated using a ratio between the signal power of the drill string measurements, and signal power of the measurements made apart from the drill string.

30. The method of claim 27 wherein a variance of peak acceleration near a zero lag correlation peak of the vibration measurements from either the drill string or apart from the drill string, filtered over a predetermined frequency range is used to indicate when rock formation is jointed, fractured or faulted.

* * * * *